US010917510B1

(12) United States Patent
Hong et al.

(10) Patent No.: US 10,917,510 B1
(45) Date of Patent: Feb. 9, 2021

(54) MOBILE TERMINAL AND ASSISTANCE DEVICE COUPLED TO THE SAME

(71) Applicant: LG ELECTRONICS INC., Seoul (KR)

(72) Inventors: Changho Hong, Seoul (KR); Geunsu Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/742,828

(22) Filed: Jan. 14, 2020

(30) Foreign Application Priority Data

Oct. 18, 2019 (KR) .................. 10-2019-0129905

(51) Int. Cl.
*H04M 1/00* (2006.01)
*H04M 1/725* (2021.01)
*G06F 1/16* (2006.01)
*H04M 1/02* (2006.01)

(52) U.S. Cl.
CPC ...... *H04M 1/72527* (2013.01); *G06F 1/1654* (2013.01); *H04M 1/0262* (2013.01); *H04M 2250/12* (2013.01)

(58) Field of Classification Search
CPC ........... H04M 1/72527; H04M 1/0262; H04M 2250/12; G06F 1/1654
USPC ...................................................... 455/557
See application file for complete search history.

(56) References Cited

U.S. PATENT DOCUMENTS

| 8,886,213 | B2* | 11/2014 | Moon | G06F 1/1684 |
| | | | | 455/456.1 |
| 9,706,126 | B2* | 7/2017 | Cho | H04N 21/42202 |
| 9,787,890 | B2* | 10/2017 | Cho | H04N 5/772 |
| 9,996,117 | B2* | 6/2018 | Lin | G06F 1/3231 |
| 10,409,472 | B2* | 9/2019 | Lee | G06F 3/04817 |
| 10,732,818 | B2* | 8/2020 | Won | G06F 3/03545 |
| 10,747,861 | B2* | 8/2020 | Kim | G06F 21/35 |
| 2016/0085327 | A1* | 3/2016 | Lee | H04M 1/185 |
| | | | | 345/173 |

* cited by examiner

*Primary Examiner* — Sonny Trinh
(74) *Attorney, Agent, or Firm* — Lee, Hong, Degerman, Kang & Waimey

(57) ABSTRACT

Disclosed is a terminal set including a mobile terminal and an assistance device configured to be selectively coupled to the mobile terminal in order to complement performance degradation of a cap sensor of the mobile terminal due to the auxiliary device. The mobile terminal includes a first cap sensor configured to sense an approach of an external object; and the assistance device includes a cover member having an auxiliary display, a seating member connected with an edge of the cover member and forming a seating area for the mobile terminal to sit therein, a mobile terminal coupling terminal provided at the seating member and connected with a power supply terminal of the mobile terminal, and a second cap sensor provided at the seating area and connected with the mobile terminal coupling terminal to sense the approach of the external object.

13 Claims, 14 Drawing Sheets

MOBILE TERMINAL AND ASSISTANCE DEVICE COUPLED TO THE SAME

CROSS-REFERENCE TO RELATED APPLICATION

Pursuant to 35 U.S.C. § 119(a), this application claims the benefit of earlier filing date and right of priority to Korean Patent Application No. 10-2019-0129905, filed on Oct. 18, 2019, the contents of which are all hereby incorporated by reference herein in their entirety.

BACKGROUND

1. Field

The present disclosure relates to a mobile terminal and an assistance device coupled to the mobile terminal to perform an additional function.

2. Description of the Related Art

Mobile terminals refer to handheld computing devices that can be carried by a user, rather than being fixed at a specific location. A typical example of the mobile terminals is a smart phone.

Functions of the mobile terminals are diversified more and more. For example, there are functions regarding data and voice communication, photographing and video recording through a camera, voice recording, music file reproduction through a speaker system, and outputting of images or videos on a display. Some mobile terminals include and implement an electronic game playing function. In particular, recently developed mobile terminals are capable of receiving a multicast signal for providing a visual content such as a broadcast, a video, and a TV program.

With the diversified functions of the mobile terminals, the mobile terminals have been implemented as multimedia players having complex functions, such as photographing a photo, recording a video, playing a music or video file, playing a game, receiving a broadcast content, and the like.

In particular, standardization of 5G communication have been widely spread and used, there are many cases of taking advantages of the 5G communication, such as a fast speed, a low latency, and the like. For example, multiple devices using a communication network may be linked to each other and thus enabled to interact with each other without latency or transmit and receive large-scale data seamlessly to use the data.

According to this trend, development of a multitasking method such as outputting a plurality of contents on a large screen or outputting a plurality of contents on a plurality of screens has been continuously made. There are some cases where the mobile terminal is coupled to a case and the case not just serves as physical protection of the mobile terminal but also performs other functions. For example, the case may be provided with an extended display and thus implement a plurality of displays, or an auxiliary power supply provided at the case may provide additional power to the mobile device. Accordingly, a variety of usability of the case may be provided. In this specification, such a case is defined as an assistance device.

Meanwhile, a cap sensor is provided at a mobile terminal in order to recognize an approach of an external object. Whether a human body has approached in the vicinity of the mobile terminal is determined based on a signal strength sensed by the cap sensor. When it is determined that the human body has approached in the vicinity of the mobile terminal, the mobile terminal may output a signal output radiating electromagnetic waves so as to prevent a hazardous influence to the human body.

Such a cap sensor is located at a rear surface of the mobile terminal and determine approaching of the human body to the rear of the mobile terminal. Yet, if an assistance device is coupled to the mobile terminal, the sensing operation of the cap sensor may be obstructed by wiring provided at the assistance device. As a result, even when there is no human body in the vicinity, the mobile terminal may erroneously determine approaching of the human body and malfunctions, and therefore performance of the mobile terminal may be degraded.

SUMMARY

An aspect provides a technology for addressing a problem that a cap sensor of a mobile terminal is not allowed to recognize an external object due to attachment of an assistance device.

In an aspect of the present disclosure, there is provided a terminal set including a mobile terminal and an assistance device configured to be selectively coupled to the mobile terminal. The mobile terminal includes a power supply terminal and a first cap sensor configured to sense an approach of an external object. The assistance device includes a cover member having an auxiliary display, a seating member connected with one edge of the cover member and forming a seating area to allow the mobile terminal to sit therein, a mobile terminal coupling terminal provided at the seating member and connected with the power supply terminal of the mobile terminal, and a second cap sensor provided at the seating area and connected with the mobile terminal coupling terminal to sense the approach of the external object.

Further, in another aspect of the present disclosure, the mobile terminal may further include a cap sensor circuit configured to cause the first cap sensor to radiate, and the cap sensor circuit may be further configured to cause the first cap sensor and the second cap sensor to radiate simultaneously.

Further, in another aspect of the present disclosure, the mobile terminal further may include a controller configured to determine whether a strength of a signal corresponding to the approach of the external object exceeds a threshold, the signal received by the cap sensor circuit, and the controller is further configured to set the threshold differently according to whether the mobile terminal is coupled to the assistance device.

Further, in another aspect of the present disclosure, the mobile terminal may further include a rear case forming a rear surface of the mobile terminal, and the first cap sensor is provided at an electronic part of the mobile terminal to be adjacent to the rear case.

Further, in another aspect of the present disclosure, the power supply terminal may be provided at the rear case, and the mobile terminal coupling terminal may be provided at the seating area.

Further, in another aspect of the present disclosure, the assistance device may further include an auxiliary wiring provided at the seating area to connect the auxiliary display and the mobile terminal coupling terminal, and the second cap sensor may be positioned not to overlap the auxiliary wiring.

Further, in another aspect of the present disclosure, the assistance device may further include an auxiliary wiring provided at the seating area to connect the auxiliary display and the mobile terminal coupling terminal, and at least one portion of the second cap sensor may overlap the auxiliary wiring, and the overlapping at least one portion of the second cap sensor is provided at a rear of the auxiliary wiring.

Further, in another aspect of the present disclosure, there is provided a terminal set including a mobile terminal and an assistance device configured to be selectively coupled to the mobile terminal. The mobile terminal may include a first cap sensor configured to sense an approach of an external object. The assistance device may include a cover member having an auxiliary display, a seating member connected with one edge of the cover member and forming a seating area to allow a rear surface of the mobile terminal to sit therein, and a second cap sensor provided at the seating area to form a pattern corresponding to the first cap sensor, and configured to radiate upon coupling with the first cap sensor electrically conductive.

Further, in another aspect of the present disclosure, a gap is present between the pattern formed by the second cap sensor and a pattern of the first cap sensor.

Further, in another aspect of the present disclosure, the mobile terminal may further comprises a rear case covering a rear of the first cap sensor, and the rear case may include a non-conductive material, and the second cap sensor may be located at an inner surface of the seating member.

Further, in another aspect of the present disclosure, there is provided a terminal set comprising a mobile terminal and an assistance device configured to be selectively coupled to the mobile terminal. The mobile terminal may include a rear case covering an electronic part to form a rear surface of the mobile terminal, a first cap sensor provided at an inner side of the rear case and configured to sense an approach of an external object, and a first cap sensor circuit configured to supply a current to cause the first cap sensor toradiate. The assistance device may include a cover member having an auxiliary display, a seating member connected with one edge of the cover member and forming a seating area to allow a rear surface of the mobile terminal to sit therein, a second cap sensor provided at the seating area, and a second cap sensor circuit configured to supply a current to cause the second cap sensor to radiate.

Further, in another aspect of the present disclosure, the mobile terminal may further include a controller configured to, when the assistance device is not coupled to the mobile terminal, control a current to be applied to the first cap sensor circuit, and, when the assistance device is coupled to the mobile terminal, control a current to be applied to the second cap sensor circuit.

Further, in another aspect of the present disclosure, the controller may be further configured to, when applying a current to one of the first cap sensor circuit or the second cap sensor circuit, control the current so as not to flow to the other one of the first cap sensor circuit or the second cap sensor circuit.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
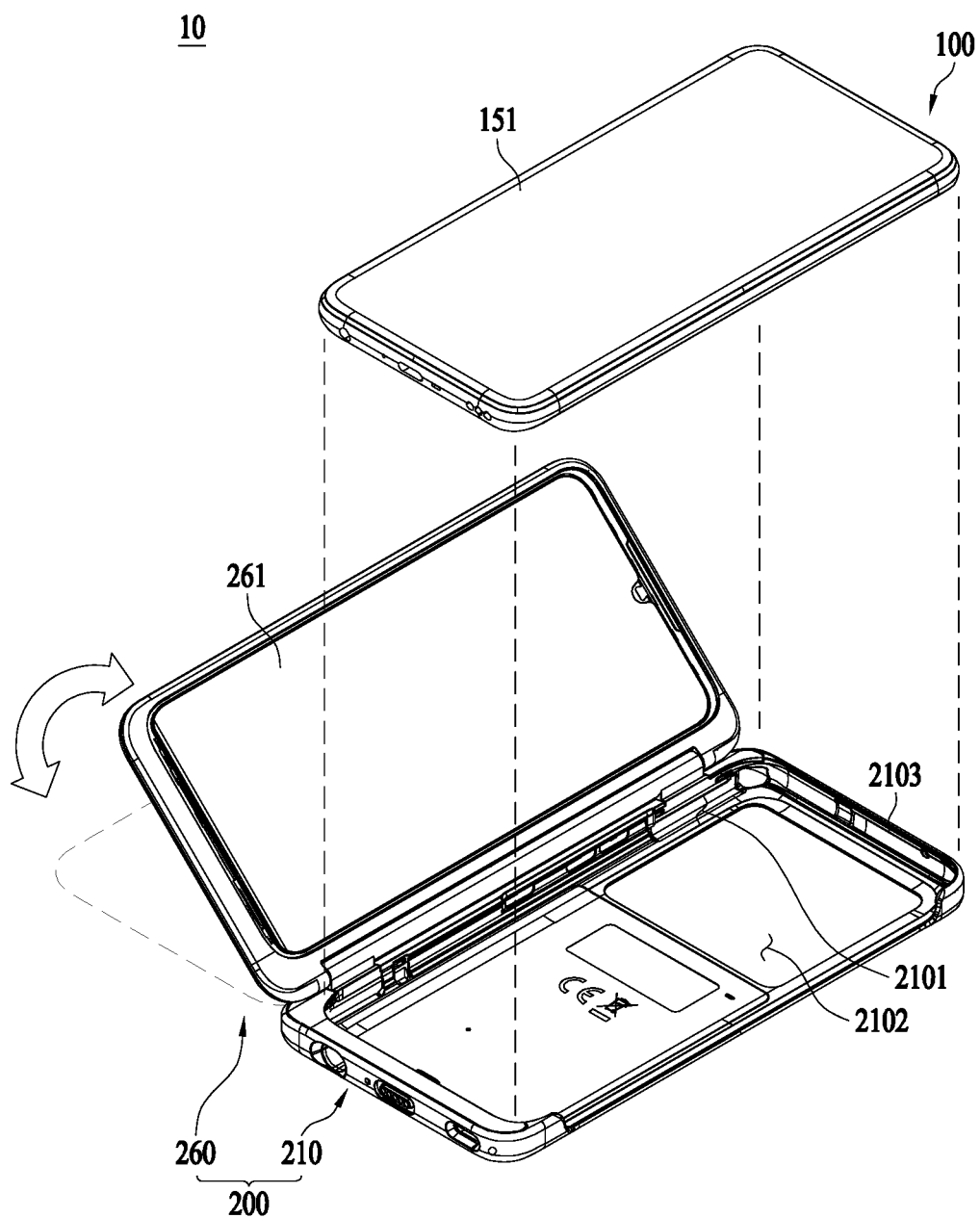
FIG. 1 is a perspective view illustrating a terminal set not assembled, according to the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Figure 2:
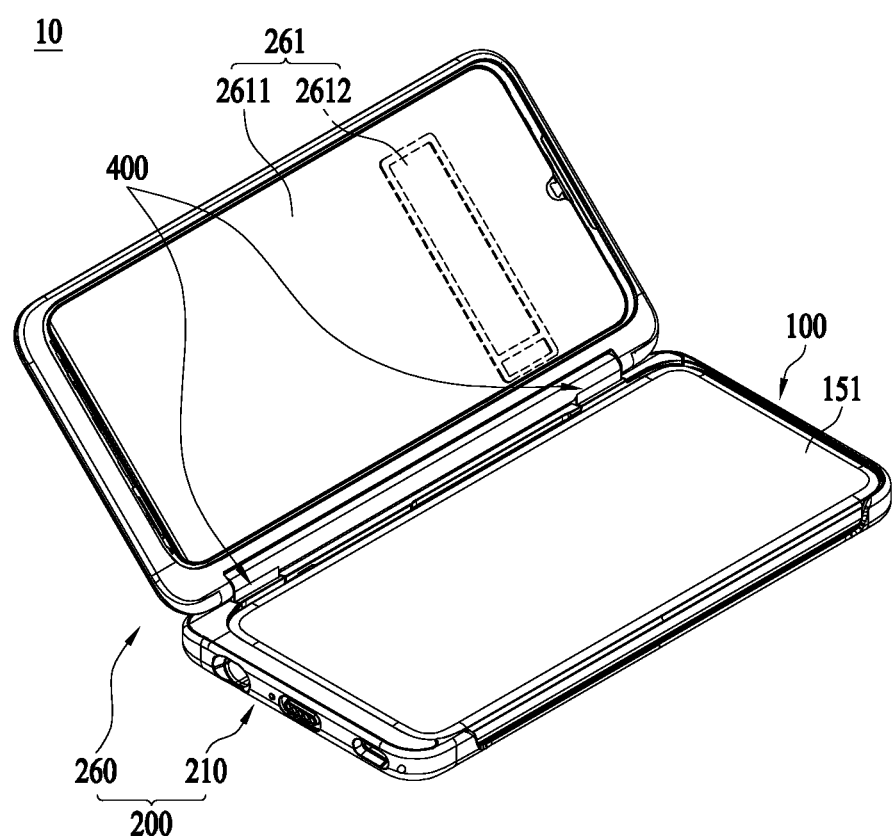
FIG. 2 is a perspective view of a terminal set assembled, according to the present disclosure.

FIGS. 1 and 2 are conceptual diagrams illustrating a terminal set 10 according to the present disclosure. FIG. 1 illustrates a state in which a mobile terminal 100 is not coupled to an assistance device 200 in the terminal set 10 according to the present disclosure, and FIG. 2 illustrates a state in which the mobile terminal 100 is coupled to the assistance device 200 in the terminal set 10 according to the present disclosure.

The terminal set 10 according to the present disclosure includes the mobile terminal 100 including a display, and the assistance device 200 coupled to the mobile terminal 100 to provide an extended display. The assistance device 200 includes a seating member 210 to be coupled to the mobile terminal 100, and a cover member 260 coupled to the seating member 210 to selectively cover the mobile terminal 100 and having the extended display mounted thereon.

As described above, the mobile terminal 100 and the assistance device 200 in the terminal set 10 of the present disclosure form output areas, respectively, thereby providing a multi-display and accordingly improving utility. A display provided at the mobile terminal 100 is referred to a main display 151, and a display provided at the assistance device 200 is referred to as an auxiliary display 261.

The auxiliary display 261 may be provided both at an inner surface and at an outer surface of the cover member 260. The auxiliary display 261 provided at the inner surface is defined as an inner auxiliary display 2611, and the auxiliary display 261 provided in the outer surface is defined as an outer auxiliary display 2612. When the cover member 260 is unfolded, the inner auxiliary display 2611 may be used to be visible at the same time with the main display. When the cover member 260 is folded, the outer auxiliary display 2612 may be used especially to be visible on the terminal set 10.

The main display 151 and the auxiliary display 261, especially the inner auxiliary display 2611, may be output in conjunction with each other. For example, the main display 151 and the inner auxiliary display 2611 may be output in a mirroring manner, an image being displayed on the main display 151 may be moved to the inner auxiliary display 2611, or an execution image for a single application or execution images for a plurality of applications associated with each other may be output in the main display and the inner auxiliary display 2611 separately. For example, a controller of a game application may be output on the main display 151, and a game content may be output on the inner auxiliary display 2611. That is, the terminal set 10 of the present disclosure may operate as a single device having a plurality of displays, and this implies that various configurations provided at the mobile terminal 100 are shared with the assistance device 200.

The outer auxiliary display 2612 may output relatively simple information. For example, the outer auxiliary display 2612 may perform functions of outputting simple text information or image information, such as receiving a call, receiving a message, and setting off an alarm. As the outer auxiliary display 2682 is provided, there is an advantage that information can be confirmed without any additional operation with the cover member 260 closed.

A controller 180 and a power supply 190 of the mobile terminal 100 may supply power not just to the main display 151 but also to the auxiliary display 261, and transmit and receive data. Accordingly, the assistance device 200 may operate without an additional controller 180 and the power supply 190. This may reduce the weight or volume of the assistance device 200 and cut down a manufacturing costs.

In order to supply power to the auxiliary display 261 and transmit and receive data, the mobile terminal 100 is physically coupled to the assistance device 200.

The seating member 210 forms a seating area 2101 in which a rear surface of the mobile terminal 100 sits. The seating member 210 forms an open area so that an output area of the display of the mobile terminal 100, that is, the main display 151, may be visible on the front side when the mobile terminal 100 seats in the seating member 210. At the same time, at least one area of the rear surface of the seating member 210 has an opening 2102 so as to expose a camera of the mobile terminal 100 and the like. A side circumference 2103 of the seating member 210 may be formed to correspond to a side circumferential shape of the mobile terminal 100 so as to enable the mobile terminal 100 to be coupled to the seating member 210 in a fit manner.

When coupled to the seating member 210, the cover member 260 forms at least one rotational axis at one edge of the seating member 210 to selectively cover the seating area 2101.

The cover member 260 provides the auxiliary display 261. A display panel of the auxiliary display 261 may be disposed on one surface of the cover member 260 to form an output area. The display panel may be provided with a touch panel to receive an external touch input.

Figure 3:
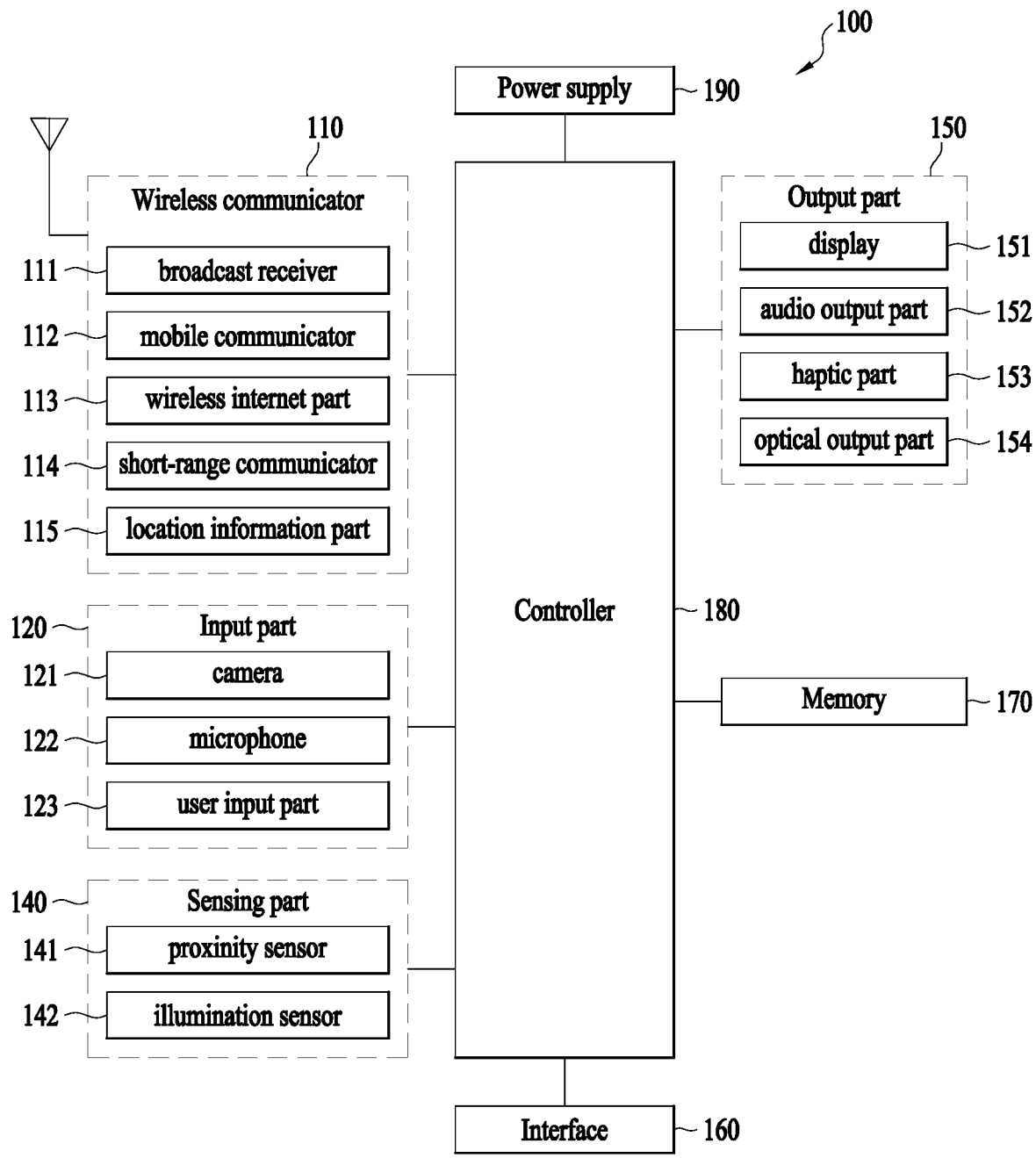
FIG. 3 is a block diagram of a mobile terminal according to the present disclosure.

FIG. 3 is a block diagram of a mobile terminal 100 according to the present disclosure.

The mobile terminal 100 may include a wireless communicator 110, an input part 120, a sensing part 140, an output part 150, an interface 160, a memory 170, a controller 180, and a power supply 190. It is understood that implementing all of the components illustrated in FIG. 3 is not a requirement, and that greater or fewer components may alternatively be implemented.

More specifically, the wireless communicator 110 may include one or more modules which enable communications such as wireless communications between the mobile terminal 100 and a wireless communication system, communications between the mobile terminal 100 and another mobile terminal 100, communications between the mobile terminal 100 and an external server. Further, the wireless communicator 110 typically includes one or more modules which connect the mobile terminal 100 to one or more networks.

The wireless communicator 110 may include one or more of a broadcast receiver 111, a mobile communicator 112, a wireless Internet part 113, a short-range communicator 114, and a location information part 115.

The input part 120 may include a camera 121 for obtaining images or video or an image input part, a microphone 122 for inputting an audio signal or an audio input part, a user input part 123 (for example, a touch key, a push key, and the like) for allowing a user to input information, and the like. Voice data or image data collected by the input part 120 may be analyzed and processed into a user's control command.

The sensing part 140 may include one or more sensors configured to sense at least one of internal information of the mobile terminal 100, the surrounding environment of the mobile terminal 100, or user information. For example, the sensing part 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone (for example, the microphone 122), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from two or more sensors of the aforementioned sensors, and combinations thereof.

The output part 150 is configured to generate various types of output, such as audio, video, tactile output, and the like. The display 151 of the mobile terminal 100 correspond to the main display described with reference to FIGS. 1 and 2. The display 151 may be inter-layered with or integrally formed with a touch sensor to facilitate a touch screen. Such a touch screen may provide an output interface between the mobile terminal 100 and a user, as well as function as the user input part 123 which provides an input interface between the mobile terminal 100 and the user.

The interface 160 serves as an interface with various types of external devices that can be coupled to the mobile terminal 100. The interface 160 may include, for example, at least one of a wired or wireless port, an external power supply port, a wired or wireless data port, a memory card port, a port for connecting a device having an identification module, an audio input/output (I/O) port, a video I/O port, or an earphone port. In some cases, the mobile terminal 100 may perform assorted control functions associated with a connected external device, in response to the external device being connected to the interface 160.

The memory 170 stores data to support various functions or features of the mobile terminal 100. For instance, the memory 170 may be configured to store application programs executed in the mobile terminal 100, data or instructions for operations of the mobile terminal 100, and the like. At least some of the application programs may be downloaded from an external server via wireless communication. At least some of the application programs may be installed within the mobile terminal 100 at time of manufacturing or shipping, which is typically the case for basic functions of the mobile terminal 100 (for example, receiving a call, placing a call, receiving a message, sending a message, and the like). Meanwhile, application programs may be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs stored in the memory 170, thereby processing or providing appropriate information and/or functions to a user.

In order to execute application programs stored in the memory 170, the controller 180 may control at least some of the above-described components described with reference to FIG. 3. Further, in order to execute application programs stored in the memory 170, the controller 180 may control at least two or more of the components included in the mobile terminal 100 in combination.

Under the control of the controller 180, the power supply 190 receives external power or internal power or provide power to each component included in the mobile terminal 100. The power supply 190 may include a battery, and the battery may be an embedded battery or a replaceable battery.

The power supply 190 may be connected with a power supply port, the power supply port may be configured as an example of the interface 160 to which an external charger for supplying power is electrically connected to charge a battery.

At least one portion of the respective components mentioned in the foregoing description can cooperatively operate to implement operations, controls or controlling methods of the mobile terminal 100 according to various embodiments of the present disclosure mentioned in the following description. Moreover, the operations, controls or controlling methods of the mobile terminal 100 can be implemented in the mobile terminal upon execution of at least one or more application programs stored in the memory 170.

Figure 4A:
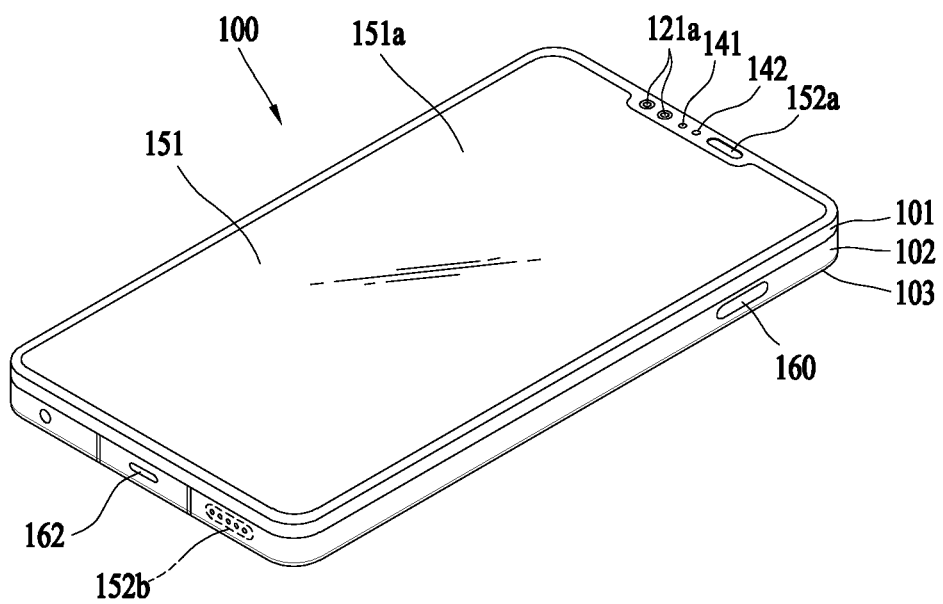
FIG. 4A is a front perspective view of a mobile terminal in accordance with the present disclosure.
Figure 4B:
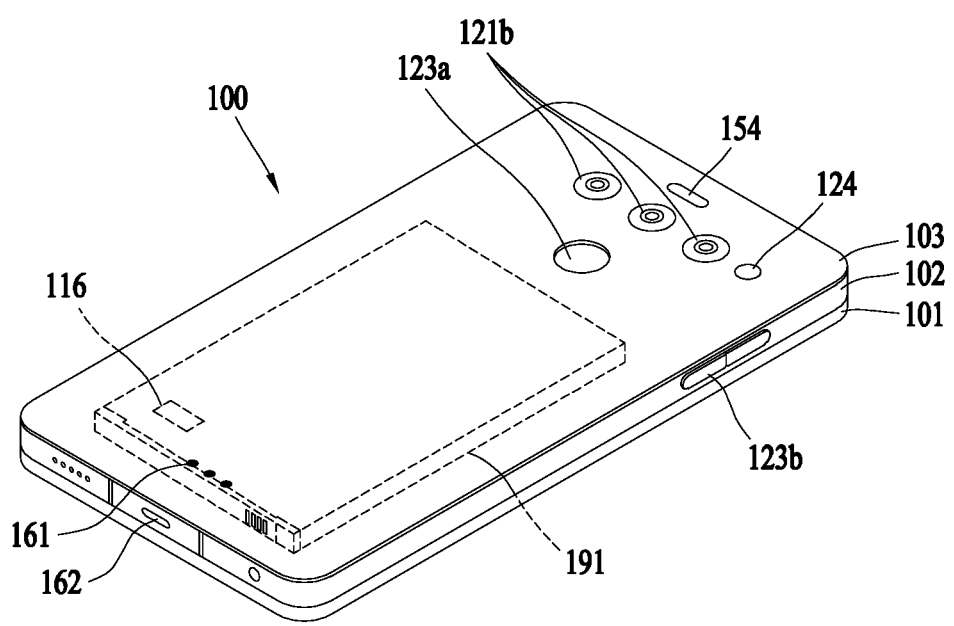
FIG. 4B is a rear perspective view of a mobile terminal according to the present disclosure.

FIG. 4A is a front perspective view of the mobile terminal 100 according to the present disclosure, and FIG. 4B is a rear perspective view of the mobile terminal 100 according to the present disclosure.

The mobile terminal 100 according to the present disclosure may be implemented as a bar-type mobile terminal body, as shown in FIGS. 4A and 4B. However, aspects of the present disclosure are not limited thereto, the mobile terminal 100 may be coupled to the assistance device 200, as described with reference to FIGS. 1 and 2. For example, a smart watch-type mobile terminal 100 may be applied to the present disclosure. In this case, the seating member 210 of the assistance device 200 may be coupled to a rear surface of the smart watch-type mobile terminal 100, and the cover member 260 may be rotatably hinged to the seating member 210 to selective cover the front side of the smart watch-type mobile terminal 100.

The mobile terminal 100 includes a case (for example, a frame, a housing, a cover, and the like) forming the appearance of the mobile terminal. As illustrated, the mobile terminal 100 may include a front case 101 and a rear case 102. Various electronic components are arranged in an inner space formed by coupling of the front case 101 and the rear case 102. At least one middle case may be additionally arranged between the front case 101 and the rear case 102.

The display 151 may be located on the front side of the mobile terminal body to output information. As illustrated, a window 151a of the display 151 may be mounted to the front case 101 to form the front surface of the mobile terminal body together with the front case 101.

In some embodiments, electronic components may also be mounted to the rear case 102. Examples of such electronic components include a detachable battery, an identification module, a memory card, and the like. In this case, a rear cover 102 may be detachably coupled to the rear case 102 to cover the electronic components mounted to the rear case. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. Meanwhile, the rear cover 103 may include an opening for externally exposing a camera 121b, an optical output part 154, a flash 124, a rear input part 123a, and the like.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating various electronic components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproofing part (not shown) for preventing introduction of water into the mobile terminal body. For example, the waterproofing part may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display 151, the first audio output part 152a, the second audio output part 152b, the proximity sensor 141, the illumination sensor 142, the optical output part 154, the first camera 121a, the second camera 121b, the first manipulating part 123a, the second manipulating part 123b, the microphone 122, the interface 160, and the like.

In the following, it is described by taking an example, as shown in FIGS. 4A and 4B, that the display 151, the first audio output part 152a, the proximity sensor 141, the illumination sensor 142, and the first camera 121a are arranged at the front side of the mobile terminal body, that the manipulating part 123b, the second audio output part 152b, the microphone 122, and the interface 160 are arranged on a side surface of the mobile terminal body, and that the optical output part 154, the manipulating part 123a, the second camera 121b, and the flash 124 are arranged at a rear side of the mobile terminal body.

However, these components are not limited to the above-described arrangement. Such components may be excluded or replaced or arranged on a different surface, when necessary. For example, the manipulating part 123a may not be provided at the front side of the mobile terminal body, and the second audio output part 152b may be provided not in the rear surface of the mobile terminal body, but in the side surface of the mobile terminal body.

The display 151 may display (output) information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, or an e-ink display.

The display 151 may be implemented using two display devices, according to an implementing form of the mobile terminal 100. In this case, a plurality of the displays may be arranged on one surface, either spaced apart from each other, or these devices may be integrated, or these devices may be arranged on different surfaces.

In order to receive a control command in a touching manner, the display 151 may include a touch sensor for sensing a touch input received at the display 151. When a touch is input to the display 151, the touch sensor may sense the touch and the controller 180 may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not shown) at a rear side of the window 151a, or a metal wire which is patterned directly on the rear surface of the window 151a. Alternatively, the touch sensor may be integrally formed with the display. For example, the touch sensor may be disposed on a substrate of the display or within the display.

As such, the display 151 may also form a touch screen together with the touch sensor. In this case, the touch screen may serve as the user input part 123 (see FIG. 3). In some cases, the touch screen may replace at least some of the functions of the first manipulating part 123a.

The first audio output part 152a may be implemented in the form of a receiver that delivers voice audio to a user's ear, and the second audio output part 152b may be implemented in the form of a loud speaker that outputs various alarm sounds or multimedia audio reproduction.

An aperture for releasing audio generated by the first audio output part 152a may be formed in the window 151a of the display 151. However, aspects of the present disclosure are not limited thereto, and audio may be released along an assembly gap between structural bodies (for example, a gap between the window 151a and the front case 101). In this case, a hole independently formed to output audio sounds may not be seen or may be hidden in terms of appearance, thereby further simplifying the appearance of the mobile terminal 100.

The optical output part 154 is configured to output light for indicating occurrence of an event. Examples of such events include a message reception, a call signal reception, a missed call, an alarm, a schedule notice, an email reception, information reception through an application, and the like. When a user has checked a generated event, the controller 180 can control the optical output part 154 to stop outputting light.

The first camera 121a processes image frames such as still or moving images obtained by the image sensor in a capture mode or a video call mode. The processed image frames may be displayed on the display 151 and may be stored in the memory 170.

The first and second manipulating parts 123a and 123b are examples of the user input part 123 that is manipulated to receive a command for controlling operation of the mobile terminal 100. The first and second manipulating parts 123a and 123b may employ any tactile method that allows the user to perform manipulation such as touch, push, scroll, or the like. In addition, first and second manipulating parts 123a and 123b may employ any non-tactile method that allows the user to perform manipulation such as proximity touch, hovering, or the like.

The manipulating part 123a may be in the form of a mechanical key or a combination of a touch key and a mechanical key. In addition, the manipulating part 123a may be in the form layered with a finger scan sensor.

Input to be received by the first and second manipulating parts 123a and 123b may be set in various ways. For example, an input to a menu, a home key, cancellation, search, or the like may be input, and an input to control a volume level being output from the first or second audio output part 152a or 152b, to switch to a touch recognition mode of the display 151, or the like may be input.

As another example of the user input part 123, a rear input part (not shown) may be located at the rear side of the mobile terminal body. The rear input part is manipulated to receive an input for controlling operation of the mobile terminal 100. The input may be set in a variety of different ways. For example, the rear input part may receive an input for power on/off, start, end, scroll, control volume level being output from the first or second audio output part 152a or 152b, switch to a touch recognition mode of the display 151, and the like. The rear input part may be configured to allow a touch input, a push input, or combinations thereof.

The rear input part may be located to overlap the display 151 of the front side in a thickness direction of the mobile terminal body. As one example, the rear input part may be located on an upper end portion of the rear side of the mobile terminal body such that a user can easily manipulate it using a forefinger when the user grabs the mobile terminal body with one hand. However, aspects of the present disclosure are not limited thereto, and the position of the rear input part may change.

As such, when the rear input part is provided at the rear side of the mobile terminal body, a new type of user interface may be implemented using the rear input part. In addition, when the first manipulating part 123a is not located at the front side of the mobile terminal body since the aforementioned touch screen or the rear input part substitute for at least some functions of the first manipulating part 123a provided at the front side of the mobile terminal body, the display 151 may be in the form of a larger screen.

Meanwhile, the mobile terminal 100 may include a finger scan sensor for recognizing a user's fingerprint. The controller 180 may use fingerprint information sensed by the finger scan sensor as part of an authentication procedure. The finger scan sensor may be embedded in the display 151 in the user input part 123.

The microphone 122 is configured to receive a user's voice, other sound, and the like. The microphone 122 may be provided in plural to receive stereo sound.

The interface 160 serves as a path allowing the mobile terminal 100 to interface with an external device. For example, the interface 160 may include one or more of a connection mobile terminal for connecting to another device (for example, an earphone, an external speaker, or the like), a port for near field communication (for example, an Infrared Data Association (IrDA) port, a Bluetooth port, a wireless LAN port, and the like), or a power supply port for supplying power to the mobile terminal 100. The interface 160 may be implemented in the form of a socket for accommodating an external card, such as Subscriber Identification Module (SIM), User Identity Module (UIM), or a memory card for information storage.

The second camera 121b may be located at the rear side of the mobile terminal body. In this case, the second camera 121b may have an image capturing direction substantially opposite to that of the first camera 121a.

The second camera 121b may include a plurality of lenses arranged along at least one line. The plurality of lenses may also be arranged in a matrix configuration. Such cameras may be referred to as an "array camera." When the second camera 121b is implemented as an array camera, images may be captured in various manners using the plurality of lenses, and images with better qualities may be obtained.

The flash 124 may be located adjacent to the second camera 121b. When an image of a subject is captured with the camera 121b, the flash 124 may illuminate the subject.

The second audio output part 152b may be additionally arranged in the mobile terminal body. The second audio output part 152b may implement stereophonic sound functions in conjunction with the first audio output part 152a, and may be also used for implementing a speaker phone mode for call communication.

At least one antenna for wireless communication may be located on the mobile terminal body. The antenna may be installed in the mobile terminal body or formed by the case. For example, an antenna which configures a part of the broadcast receiver 111 may be retractable into the mobile terminal body. Alternatively, an antenna may be in the form of a film attached to an inner surface of the rear cover 103 or in the form of a case including a conductive material.

A power supply 190 (see FIG. 3) for supplying power to the mobile terminal 100 may be provided at the mobile terminal body. The power supply 190 may include a battery 191 embedded in the mobile terminal body or detachably coupled to an outside of the mobile terminal body.

The battery 191 may be configured to receive power via a power source cable connected to the interface 160. Also, the battery 191 may be configured to be recharged in a wireless manner using a wireless charger. Wireless charging may be implemented by magnetic induction (electromagnetic resonance).

Meanwhile, in the drawing, the rear cover 103 is coupled to the rear case 102 for shielding the battery 191, to prevent separation of the battery 191, and to protect the battery 191 from an external impact or from foreign material. When the battery 191 is detachable from the mobile terminal body, the rear case 103 may be detachably coupled to the rear case 102.

Figure 5:
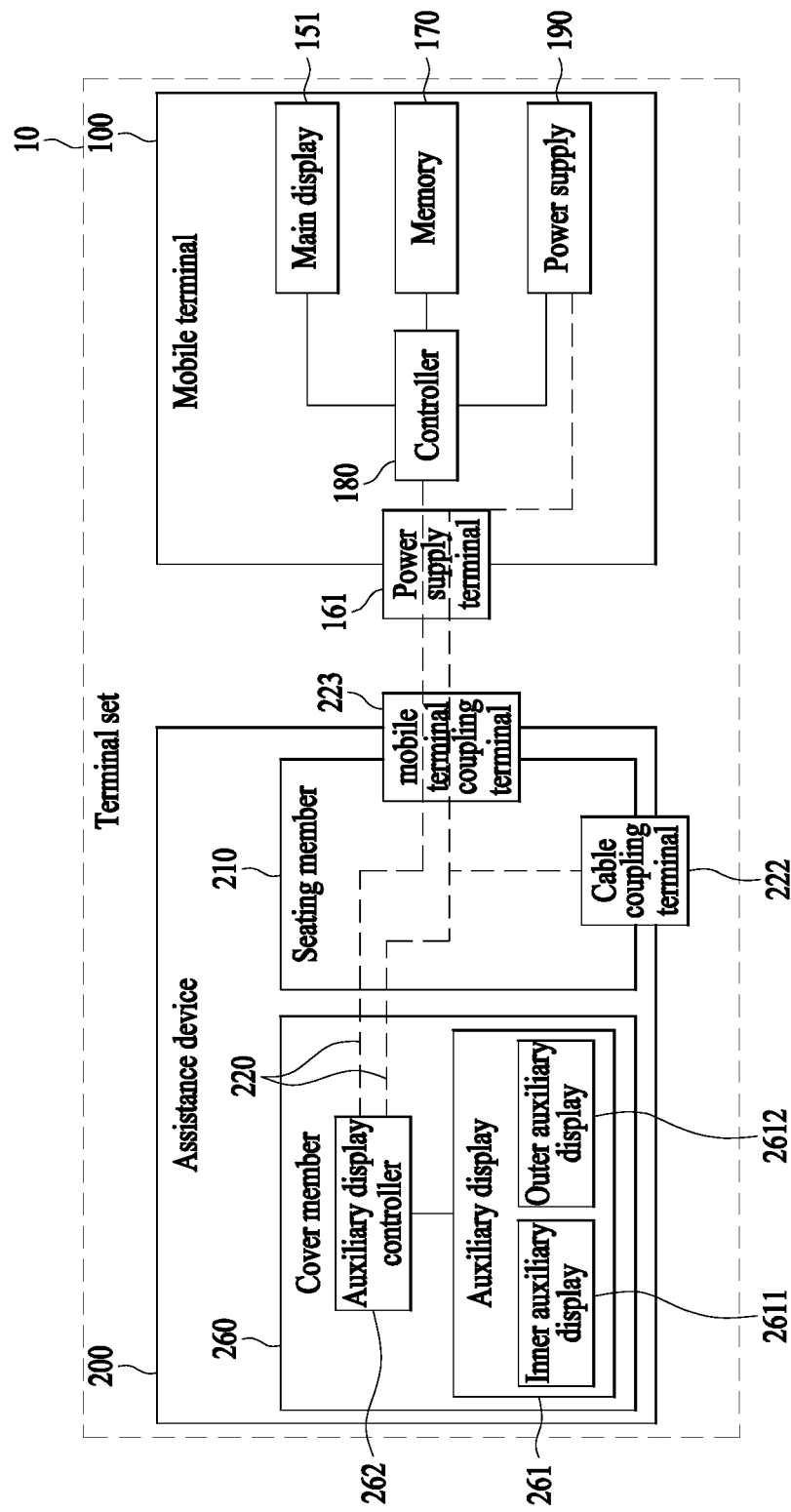
FIG. 5 is a block diagram illustrating a terminal set according to the present disclosure.

FIG. 5 is a block diagram illustrating a terminal set 10 according to the present disclosure.

As described above, the terminal set 10 according to the present disclosure may be divided into a mobile terminal 100 and an assistance device 200. The assistance device 200 includes a seating member 210 and a cover member 260. A main display 151 is provided at the mobile terminal 100, and an auxiliary display 261 is provided at the cover member 260.

A controller 180 may be provided at the mobile terminal 100 and control operation of the main display 151 and the auxiliary display 261. That is, as described with reference to FIG. 3, the controller 180 may control overall operation of the mobile terminal 100 and may further control operation regarding outputting of the auxiliary display 261. The controller 180 may include a physical form of an application processor (AP) or a system-on-chip (SOC).

A memory 170 provided at the mobile terminal 100 may be used for operation of the main display 151 and even for operation of the auxiliary display 261. For example, a game application stored in the memory 170 of the mobile terminal 100 may be executed by signal processing and computation of the controller 180, and data for outputting a screen may be output on the main display 151 or may be transmitted to the assistance device 200 to be output on the auxiliary display 261.

A power supply 190 of the mobile terminal 100 may supply power not just for operation of an internal configuration of the mobile terminal 100, but also for operation of the assistance device 200. The auxiliary display 261 may be driven dependent on an AP, the memory 170, and the power supply 190 of the mobile terminal 100. In particular, an auxiliary display controller 262 for controlling outputting of the auxiliary display 261 may be provided at the cover member 260. The auxiliary display controller 262 may convert data transmitted from the mobile terminal 100 and output the converted data to the auxiliary display 261 or may perform other auxiliary operation necessary for outputting of the auxiliary display 261. Further, the assistance device 200 may be provided with a touch panel corresponding to the auxiliary display 261 and may generate, process, and transmit an input signal through the touch panel.

Further, as a magnet for sensing coupling and a hall sensor may be provided at the assistance device 200 and the mobile terminal 100, a user interface for starting linking to the auxiliary display 261 may be output on the main display 151 and power supply to the auxiliary display 261 may start.

The assistance device 200 and the mobile terminal 100 are electrically connected with each other to supply power and transmit and receive data. More specifically, the auxiliary display 261 of the cover member 260 may be electrically connected all the way with the mobile terminal 100 to transmit and receive power and data.

The seating member 210 may include a mobile terminal coupling terminal 223 to be coupled to a power supply terminal 161 of the mobile terminal 100. When coupled to the assistance device 200, the mobile terminal 100 may transmit and receive power or data from an outside through a Cable coupling terminal 222 exposed at an outer side of the assistance device 200.

The assistance device 200 may be provided with a circuit for operating while electrically connected with the mobile terminal 100 or an external device. A general term of the circuit is defined as an auxiliary circuit. The auxiliary circuit includes an auxiliary wiring 221 and the mobile terminal coupling terminal 223. The mobile terminal coupling terminal 223 is exposed from the assistance device 200 so as to be brought into contact with the power supply terminal 161 of the mobile terminal 100. The auxiliary wiring 221 connects the mobile terminal coupling terminal 223 and an electronic configuration (e.g., the auxiliary display 261) of the assistance device 200 to form an electrical path.

Figure 6:
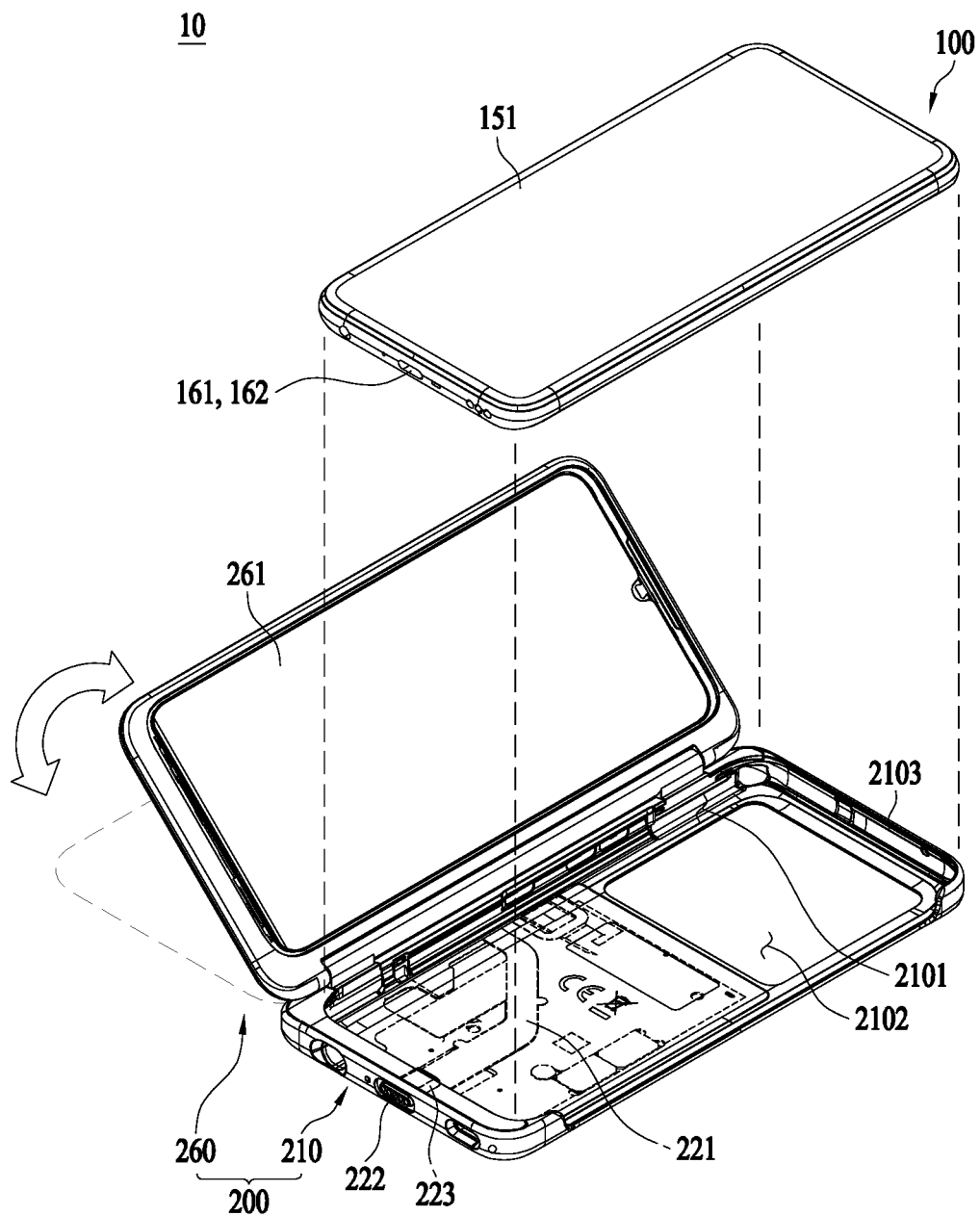
FIGS. 6 and 7 illustrate examples of a terminal set according to the present disclosure.
Figure 7:
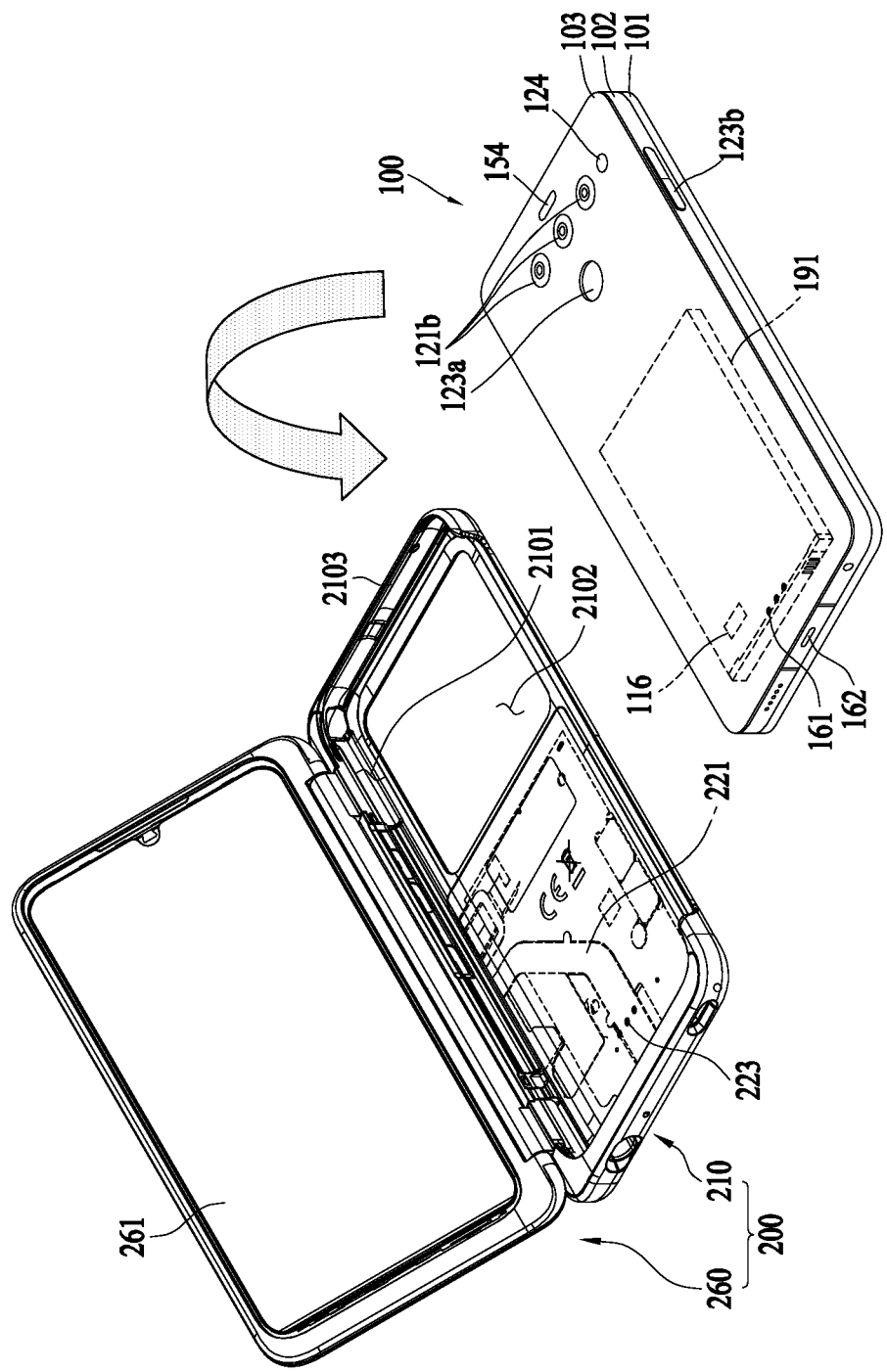

FIGS. 6 and 7 illustrate examples of the terminal set 10 according to the present disclosure.

A power supply terminal 161 of a mobile terminal may be brought into physical contact with a mobile terminal coupling terminal 223 of an assistance device 200 to thereby transmit and receive power or data. The power supply terminal 161 may be a power supply port 162 of the mobile terminal 100 (see FIG. 6) or may be a configuration provided separately from a power supply port 162 (see FIG. 7). In the former case, the mobile terminal 100 does not need an additional mobile terminal only for the assistance device 200, and thus, there is an advantage in that it is possible to prevent a manufacturing cost m from increasing and simplify a circuit structure. In the latter case, since a direction of coupling the mobile terminal 100 and the assistance device 200 is identical to a direction in which mobile terminals come into contact, there is an advantage that no interference occurs.

Figure 8:
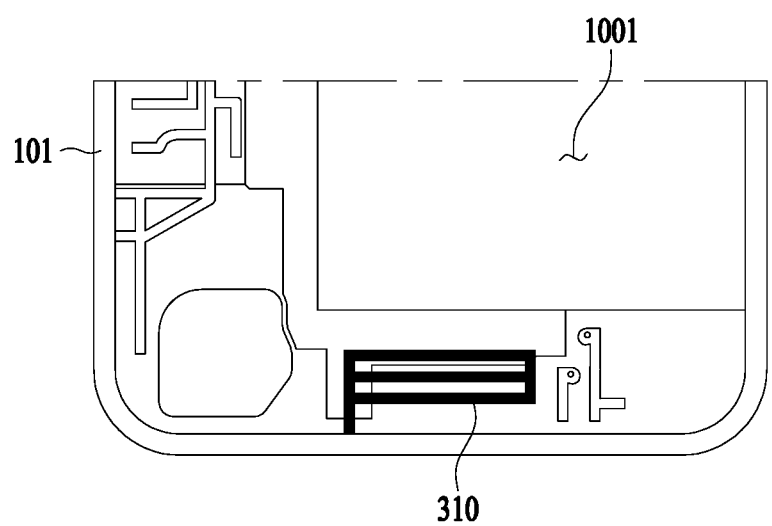
FIG. 8 illustrates an example of a mobile terminal from which a rear case is separated.
Figure 8:
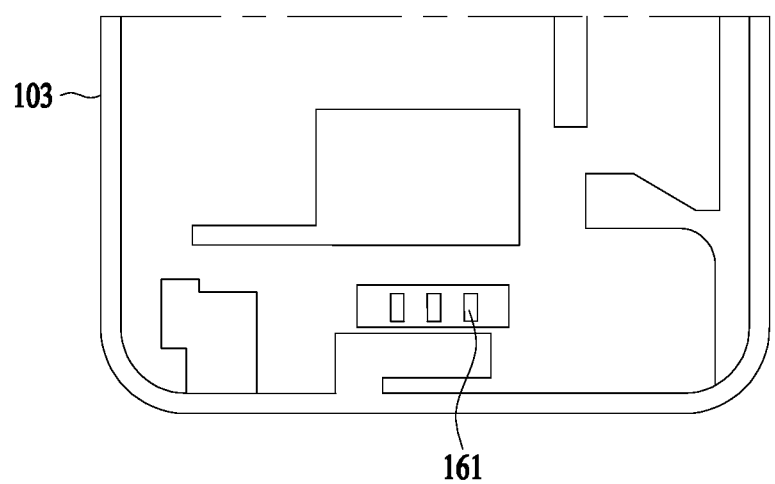

FIG. 8 illustrates an example of a mobile terminal 100 from which a rear case 103 is separated.

A cap sensor 310 for determining whether an external object is located in the proximity is provided at the mobile terminal 100. In particular, a cap sensor 310 may be disposed behind an electronic part 1001 to determine an approach of an external object located behind the mobile terminal 100.

The cap sensor 310 may be used to reduce electronic wave radiation strength when a human body approaches the mobile terminal 100. It is because the electromagnetic waves radiated by the mobile terminal 100 is harmful for the human body. Regarding the electromagnetic waves, there is an international standard test such as Limb SAR test.

When a signal received by the cap sensor 310 has strength equal to or greater than a predetermined size, that is, when it is determined that a human body behind the mobile terminal 100 approaches within a predetermined distance, the intensity of outputting electromagnetic waves may be reduced to a preset value. When it is determined that the human body moves the predetermined distance away from the mobile terminal 100, electromagnetic waves may be output at an original set intensity.

The cap sensor 310 may form a radiation pattern and operate in a manner similar to an antenna principle. The cap sensor 310 may be implemented in the form of a conductive thin-film pattern. For pattern radiation of the cap sensor 310, a cap sensor circuit may be connected. The cap sensor circuit allow a current to flow to the radiation pattern so that the cap sensor 310 may radiate.

In consideration of the above-described functional characteristics, a conductive material interfering with a radiated signal should not be present between the cap sensor 310 and an external object.

In order to sense the human body approaching from behind the mobile terminal 100, the cap sensor 310 of the mobile terminal 100 may be disposed at the rearmost portion of the electronic part 1001, and the rear case 103 for covering the electronic part 1001 to form a rear surface of the mobile terminal 100 may be formed of a non-conductive material. Accordingly, the rear case 103 may be formed of a material such as glass and plastic.

However, when an assistance device 200 is coupled to the mobile terminal 100, conductive materials such as the auxiliary wiring 221 of the assistance device 200 may interfere with sensing of the cap sensor 310 of the mobile terminal 100. That is, due to the conductive materials of the assistance device 200, it is difficult to normally sense an approach of an external object.

Figure 9:
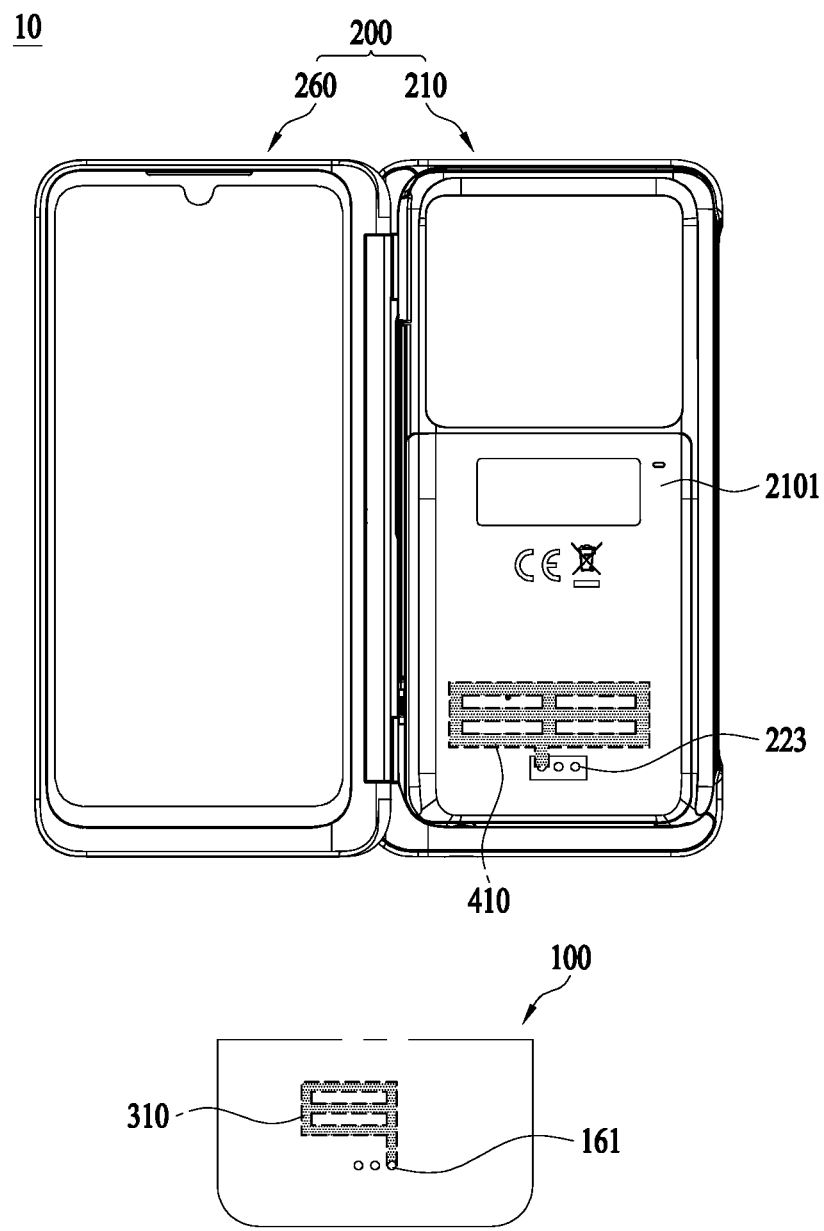
FIG. 9 illustrates an example of a terminal set according to the present disclosure.

FIG. 9 illustrates an example of a terminal set 10 according to the present disclosure.

In order to address the above-described problem, the present disclosure proposes an assistance device 200 with an additional cap sensor additionally provided therein.

In order to differentiate two cap sensors, a cap sensor provided at a mobile terminal is defined as a first cap sensor 310 and a cap sensor provided at the assistance device 200 is defined as a second cap sensor 410.

The second cap sensor 410 is provided at a seating member 210, especially a seating area 2101, of the assistance device 200. When the assistance device 200 is coupled to the mobile terminal 100, the second cap sensor 410 may substitute for or complement the first cap sensor 310 to sense a human body approaching from behind the terminal set 10.

Even in this case, a conductive material interfering with the sensing of the human should not be present behind the second cap sensor 410. Accordingly, the second cap sensor 410 needs to be provided at a way not to be interfered with by the auxiliary wiring 221 provided at the seating area 2101 of the seating member 210 or by an electronic configuration (e.g., a chipset being involved in driving of the assistance device 200) provided at the assistance device 200.

Figure 10:
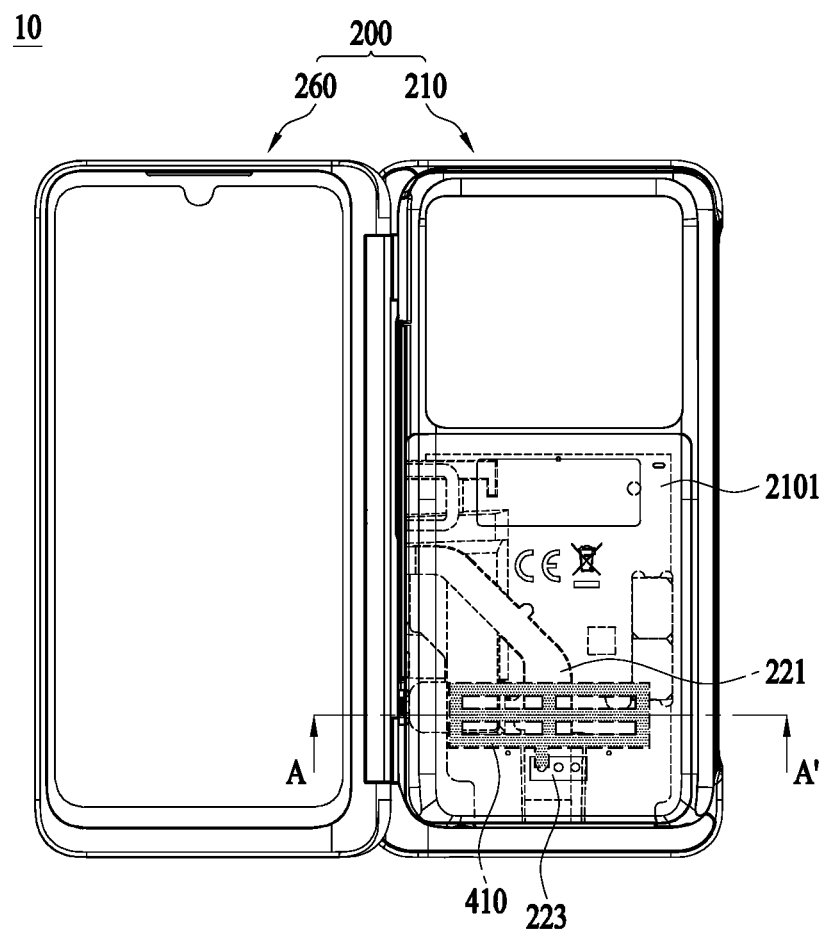
FIG. 10 is a cross-sectional conceptual view of a seating member.
Figure 10:
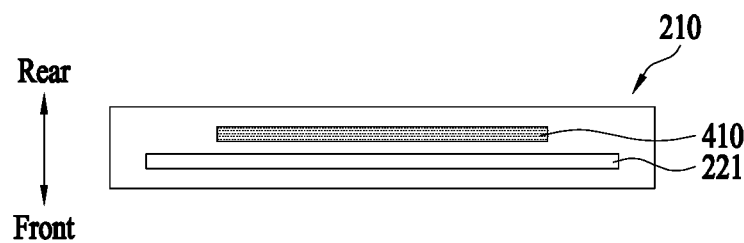
Figure 11:
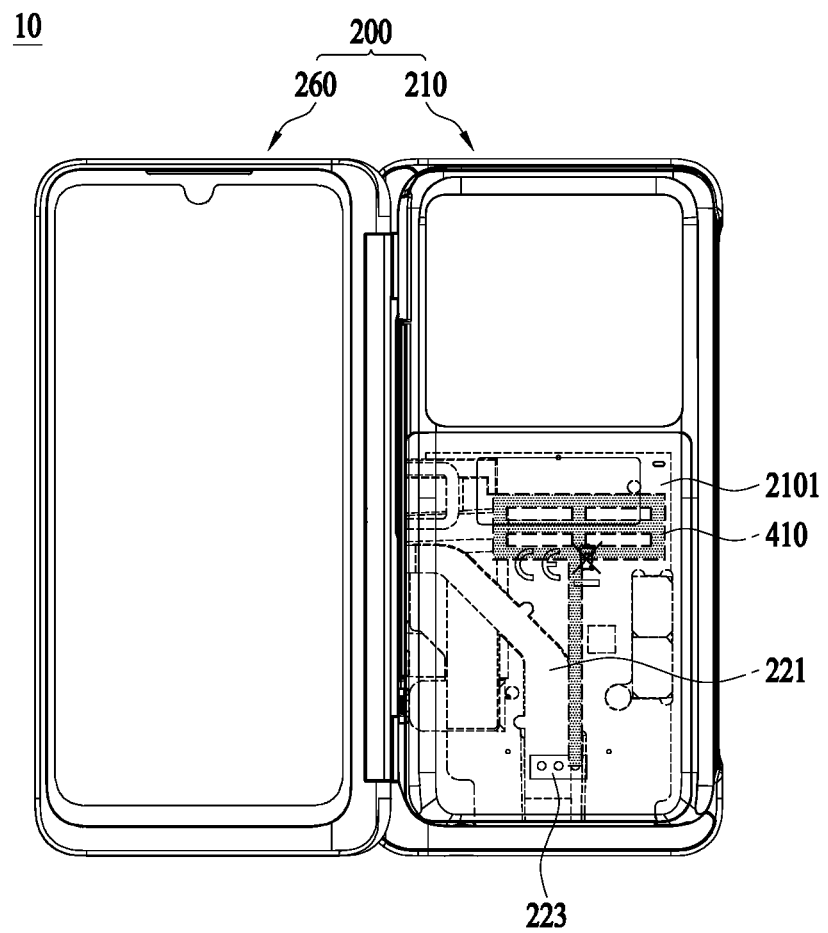
FIG. 11 is a plan conceptual view of a seating member.

FIG. 10 is a cross-sectional conceptual view of a seating member 210, and FIG. 11 is a plan conceptual view of the seating member 210.

FIGS. 10 and 11 illustrate two types of the seating member 210 for satisfying the aforementioned condition.

Referring to FIG. 10, with reference to a thickness direction of a terminal set 10, a second cap sensor 410 may be disposed at a portion further behind an auxiliary wiring 221 provided at a seating area 2101. That is, even though an area where the second cap sensor 410 overlaps a conductive material, such as an assistance device 221, is present in the plane of the seating area 2101, if the second cap sensor 410 is disposed further behind the conductive material overlapping area, noise does not occur in the course of performing object recognition in a rear surface direction.

As one specific example, a seating member 210 may form a stepped area recessed in at least a portion of the seating area 2101. The second cap sensor 410 may be disposed in at least one portion of the stepped area, a shielding film for shielding the second cap sensor 410 and the inside may be provided at an inner surface, the auxiliary wiring 221 may be provided at an inner side of the shielding film, and a protective sheet may be provided at an inner side of the auxiliary wiring 221.

Referring to FIG. 11, as another form for satisfying the aforementioned condition, a second cap sensor 410 and an auxiliary wiring 221 may be positioned not to overlap each other with reference to the plane of a seating area 2101, regardless of arrangement in a thickness direction of a terminal set 10. The non-overlapping second cap sensor 410 may sense the proximity of a human body located behind the terminal set 10 without noise occurrence.

In the following, three embodiments according to difference in a manner in which the second cap sensor 410 is driven will be described.

Embodiment 1

Referring back to FIG. 9, a second cap sensor 410 may be driven while electrically connected with a first cap sensor 310. The cap sensor circuit for driving the first cap sensor 310 may drive not just the first cap sensor 310, but also the second cap sensor 410 electrically connected with the first cap sensor 310.

More specifically, the second cap sensor 410 may be connected through a mobile terminal coupling terminal 223 with a power supply terminal 161 of a mobile terminal 100 and further with the first cap sensor 310 and a circuit.

In threshold setting for determining whether a human body approaches based on a strength of signal sensed by the cap sensor, a controller 180 may apply different thresholds in the case of driving only the first cap sensor when an assistance device 200 is not coupled and in the case of driving both the first cap sensor 310 and the second cap sensor when the assistance device 200 is coupled. For example, a threshold used in the case of sensing an approach of a human body by using only the mobile terminal 100 may be set to be higher than a threshold used in the case of sensing an approach of a human body by using the terminal set 10. This is to compensate for a signal strength measured by the first cap sensor 310, the signal strength which increases due to conductive configurations positioned between the first cap sensor 310 and the second cap sensor 410.

The basic driving principle of the second cap sensor 410 is identical to that of the first cap sensor 310 as long as it contradicts the above description regarding the first cap sensor 310.

FIG. 9 illustrates a form of FIG. 7 in which the power supply terminal 161 is provided separately from a power supply port 162 of the mobile terminal. However, aspects of the present disclosure are not limited thereto, and the same principle may be applied eve in the case where the power supply port 162 is provided at the form of the power supply terminal 161, as shown in FIG. 6. The same applies to the following embodiments.

Embodiment 2

Figure 12:
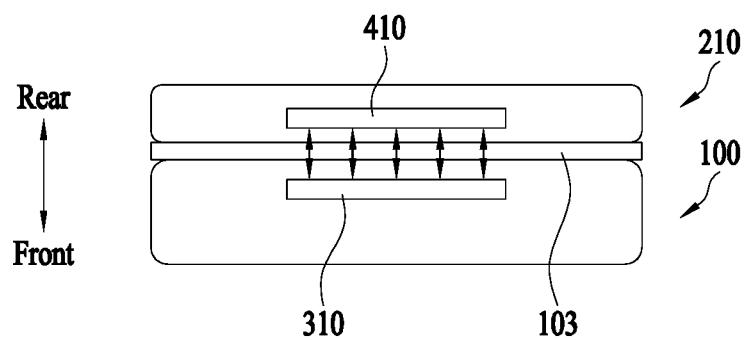
FIG. 12 is a cross-sectional conceptual view of a terminal set according to the present disclosure.

FIG. 12 is a cross-sectional conceptual view of a terminal set 10 according to the present disclosure.

While Embodiment 1 illustrates the case where a second cap sensor 410 and a first cap sensor 310 are connected directly with each other by a conductive member, the present embodiment illustrates the case where the first cap sensor 310 and the second cap sensor 410 may be coupled to each other without any electrical contact and accordingly the second cap sensor 410 may radiate.

More specifically, as a pattern of the first cap sensor 310 and a pattern of the second cap sensor 410 may form a predetermined gap with respect to the thickness direction of a terminal set 10 and the cap sensor applies a current to the first cap sensor 310, the second cap sensor 410 may be coupled and radiated as well. At this point, the respective patterns of the first cap sensor 310 and the second cap sensor 410 may be configured differently, but it is preferable that the first cap sensor 310 and the second cap sensor 410 overlap in at least a portion within the plane of the seating area 2101.

The gap between the first cap sensor 310 and the second cap sensor 410 is not necessarily an empty space, and a non-conductive material may be provided in the gap. For example, the non-conductive material may be a rear case 103 of the mobile terminal 100 and the inner surface of a seating member 210 of an assistance device 200. However, to achieve a sufficient coupling effect, it is preferable that the first sensor 310 is provided as close to the inner surface of the rear case 103 as possible and the second cap sensor 410 is provided as close to the inner surface of the seating member 210 as possible.

Embodiment 3

Figure 13:
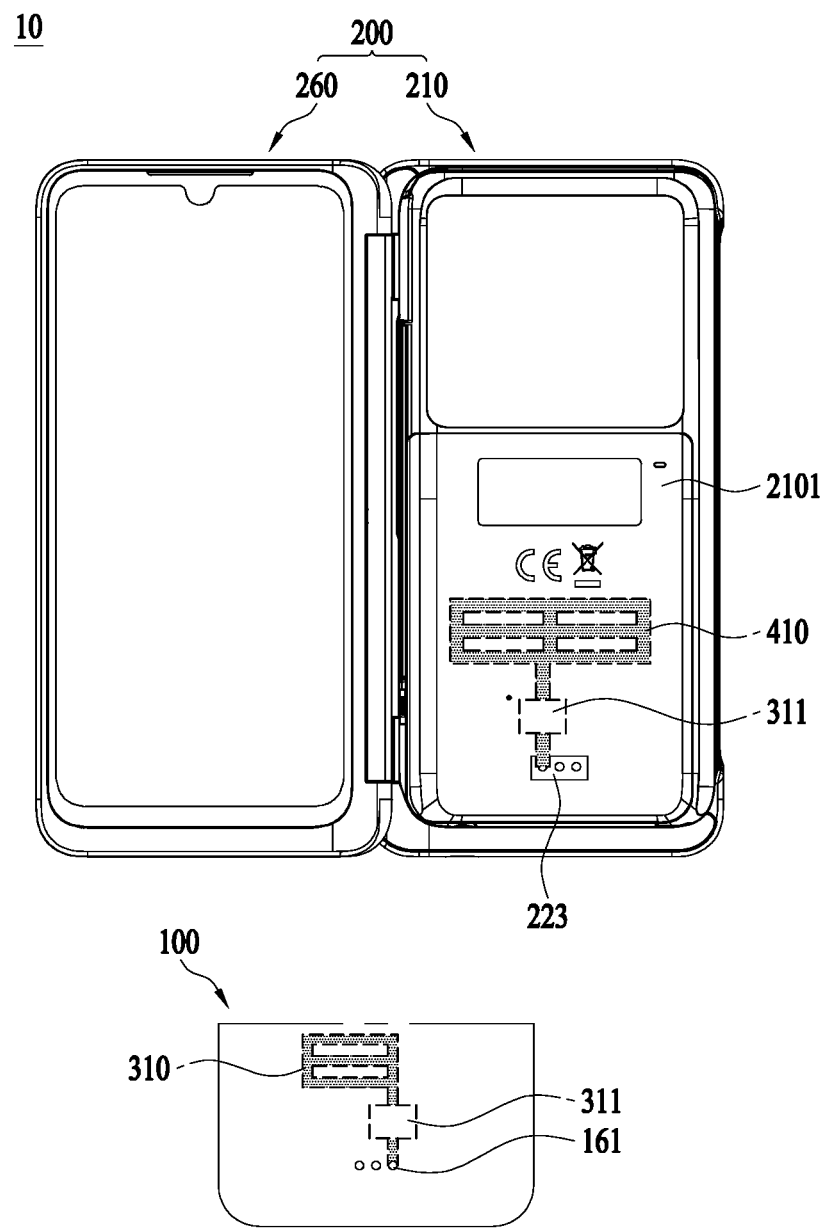
FIG. 13 is a conceptual diagram of an example of an assistance device according to the present disclosure.

FIG. 13 is a conceptual diagram of an example of an assistance device 200 according to the present disclosure.

A second cap sensor 410 may be provided completely independent of a first cap sensor 310. In Embodiment 1 and Embodiment 2, as the cap sensor circuit is shared, the first cap sensor 310 is also radiated, thereby increasing the possibility of noise or variable occurrence. In particular, when the form of Embodiment 2 is implemented, requirements for coupling with the first cap sensor 310 should be additionally met. Accordingly, compatibility of an assistance device 200 according to the mobile terminal 100 is not ensured.

In Embodiment 3, the second cap sensor 410 is driven completely independently of the first cap sensor 310, thereby addressing the aforementioned problems.

More specifically, in the present embodiment, before a mobile terminal 100 and the assistance device 200 is coupled to each other, the first cap sensor 310 and the first cap sensor 310 circuit connected to the first cap sensor 310 are activated. When the mobile terminal 100 and the assistance device 200 are coupled to each other, the second cap sensor 410 and the second cap sensor 410 circuit are activated.

Due to the independent driving of the second cap sensor 410, the pattern freedom of the second cap sensor 410 increases and also becomes free when it comes to arrangement in a seating area 2101. Even in this case, however, the second cap sensor 410 circuit may be formed to be electrically connected with the mobile terminal 100 to receive power.

It is apparent to those skilled in the art that the present disclosure may be materialized in other specific forms without departing from the essential characteristics of the present disclosure.

The detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

The following are effects of a terminal set according to the present disclosure.

According to at least one of embodiments of the present disclosure, it is possible to avoid performance degradation since an approach of an external object may be recognized even after an assistance device is coupled.

Further, according to at least one of embodiments of the present disclosure, it is possible to maintain the same performance when the assistance device is coupled to a mobile terminal and when the assistance device is separated from the mobile terminal/

Further, according to at least one of embodiments of the present disclosure, it is possible to apply the characteristics of the present disclosure even without changing a cap sensor-related structure implemented in an existing mobile terminal.

Further, according to at least one of embodiments of the present disclosure, it is possible to maintain the same performance when the mobile terminal is provided alone and when the assistance device is coupled to the mobile terminal.

Additional ranges of possibilities will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

What is claimed is:

1. A terminal set comprising:
a mobile terminal; and
an assistance device configured to be selectively coupled to the mobile terminal,
wherein:
the mobile terminal comprises a power supply terminal and a first cap sensor configured to sense an approach of an external object; and
the assistance device comprises:
a cover member having an auxiliary display;
a seating member connected with an edge of the cover member and forming a seating area for the mobile terminal to sit therein;
a mobile terminal coupling terminal provided at the seating member and configured to couple with the power supply terminal of the mobile terminal; and
a second cap sensor provided at the seating area and connected with the mobile terminal coupling terminal to sense the approach of the external object.

2. The terminal set of claim 1, wherein:
the mobile terminal further comprises a cap sensor circuit configured to cause the first cap sensor to radiate; and
the cap sensor circuit is further configured to cause the first cap sensor and the second cap sensor to radiate simultaneously.

3. The terminal set of claim 2, wherein:
the mobile terminal further comprises a controller configured to determine whether a strength of a signal corresponding to the approach of the external object exceeds a threshold, the signal received by the cap sensor circuit; and
the controller is further configured to set the threshold differently according to whether the mobile terminal is coupled to the assistance device.

4. The terminal set of claim 1, wherein:
the mobile terminal further comprises a rear case forming a rear surface of the mobile terminal; and
the first cap sensor is provided at an electronic part of the mobile terminal to be adjacent to the rear case.

5. The terminal set of claim 4, wherein:
the power supply terminal is provided at the rear case; and
the mobile terminal coupling terminal is provided at the seating area.

6. The terminal set of claim 1, wherein:
the assistance device further comprises an auxiliary wiring provided at the seating area to connect the auxiliary display and the mobile terminal coupling terminal; and
the second cap sensor is positioned not to overlap the auxiliary wiring.

7. The terminal set of claim 1, wherein:
the assistance device further comprises an auxiliary wiring provided at the seating area to connect the auxiliary display and the mobile terminal coupling terminal; and
at least one portion of the second cap sensor overlaps the auxiliary wiring, and the overlapping at least one portion of the second cap sensor is provided at a rear of the auxiliary wiring.

8. A terminal set comprising:
a mobile terminal; and
an assistance device configured to be selectively coupled to the mobile terminal,
wherein:
the mobile terminal comprises a first cap sensor configured to sense an approach of an external object; and
the assistance device comprises:
a cover member having an auxiliary display;
a seating member connected with an edge of the cover member and forming a seating area for a rear surface of the mobile terminal to sit therein; and
a second cap sensor provided at the seating area to form a pattern corresponding to the first cap sensor, and configured to radiate upon coupling with the first cap sensor that is turned on.

9. The terminal set of claim 8, wherein a gap is present between the pattern formed by the second cap sensor and a pattern of the first cap sensor.

10. The terminal set of claim 8, wherein:
the mobile terminal further comprises a rear case covering a rear of the first cap sensor;
the rear case comprises a non-conductive material; and
the second cap sensor is located at an inner surface of the seating member.

11. A terminal set comprising:
a mobile terminal; and
an assistance device configured to be selectively coupled to the mobile terminal,
wherein:
the mobile terminal comprises:
a rear case covering an electronic part to form a rear surface of the mobile terminal;
a first cap sensor provided at an inner side of the rear case and configured to sense an approach of an external object;
a first cap sensor circuit configured to supply a current to cause the first cap sensor to radiate; and
the assistance device comprises:
a cover member having an auxiliary display;
a seating member connected with an edge of the cover member and forming a seating area for the rear surface of the mobile terminal to sit therein;
a second cap sensor provided at the seating area; and a second cap sensor circuit configured to supply a current to cause the second cap sensor to radiate.

12. The terminal set of claim 11, wherein the mobile terminal further comprises a controller configured to:
when the assistance device is not coupled to the mobile terminal, control a current to be applied to the first cap sensor circuit; and
when the assistance device is coupled to the mobile terminal, control a current to be applied to the second cap sensor circuit.

13. The terminal set of claim 12, wherein the controller is further configured to, when applying a current to one of the first cap sensor circuit or the second cap sensor circuit, control the current so as not to flow to the other one of the first cap sensor circuit or the second cap sensor circuit.

* * * * *